United States Patent

Blatter et al.

[11] Patent Number: 6,166,123
[45] Date of Patent: *Dec. 26, 2000

[54] REFLECTIVE COMPOSITION OF PARTICLES WITH RESINOUS BINDER AND PROCESS FOR PREPARING SAME

[75] Inventors: Walter J. Blatter, Cottage Grove; Thomas J. Crompton, Centerville, both of Minn.; Gregory D. Walls, Hudson, Wis.

[73] Assignee: H. B. Fuller Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/946,507

[22] Filed: Oct. 7, 1997

[51] Int. Cl.[7] ............... C08J 5/10; C08K 3/08; C08L 31/00

[52] U.S. Cl. ............ 524/441; 524/439; 524/440

[58] Field of Search ............... 524/439, 440, 524/441; 523/172; 428/407

[56] References Cited

U.S. PATENT DOCUMENTS 5,045,114  9/1991  Bigalk et al. .
5,187,220  2/1993  Richart et al. .

FOREIGN PATENT DOCUMENTS 1-236284  3/1988  Japan .
1404556  9/1975  United Kingdom .

*Primary Examiner*—James J. Seidleck
*Assistant Examiner*—U. K. Rajguru
*Attorney, Agent, or Firm*—Nancy N. Quan

[57] ABSTRACT

A method of manufacturing powder coating compositions, the powder coating compositions, and cured coatings made from the coating compositions are described. The method of preparing the coating compositions comprises combining a preformulated thermally softenable resin powder (having a defined $T_g$) and a reflective pigments (such as a non-leafing or leafing metallic flake, mica, optically variable pigment, and the like) and then mixing the powder and flake under high shear conditions and assuring that the average temperature of the mixture remains below the $T_g$ of the resin during the high speed mixing process. The powder coating compositions are free of pasted aluminum flake and comprise thermally softenable resin particles having a number average diameter of between 15 and 60 microns, leafed metallic flakes having a number average maximum diameter of between 4 and 45 microns, said powder when coated onto a metallic surface in a thickness of at least 10 microns and melted and cured, providing a reflectivity of at least 400 at 20 degrees viewing angle. The resultant coating may also be free of the plasticizer, solvent or thickener used in pasted aluminum.

16 Claims, No Drawings

REFLECTIVE COMPOSITION OF PARTICLES WITH RESINOUS BINDER AND PROCESS FOR PREPARING SAME

BACKGROUND OF THE INVENTION

Field of the Invention

The present invention relates to powder coating technology which can be used to produce hard, uniform coatings through the heat curing of a powder uniformly applied to a surface. In particular, it relates to the production of a coating composition and to its application to a surface which coating composition, after heating, forms a shiny, reflective metallic appearance. The preferred powder coating is based on aluminum flakes and a thermosetting resin.

Bright, shiny, metallic finishes are desirable in many commercial applications. The major source of these shiny finishes is chemical or electrical plating of metals such as chrome. However, chemical coating processes such as chrome treatments have environmental and economic drawbacks. Chromium is a major source of heavy metal contamination and is expensive to produce. With this in mind, a great deal of attention has been given to producing shiny coatings with powder compositions. Powder coatings are generally produced by mixing a binder with other constituents which can be melt mixed, cooled, and pulverized to provide a powder material that is easily applied to a conductive surface. The powder or surface is then heated to cause the powder coating composition to melt and flow to form a continuous coating.

The powder coating compositions are most commonly applied through electrostatic spray coating or fluidized bed coating. In the electrostatic spray process, the coating composition is dispersed in an air stream before being subjected to a high voltage field in which the particles pick up an electrostatic charge. The charged particles are then attracted to a grounded or charged substrate. The coated substrate is then heated to a temperature sufficient to melt the powder coating and to cause it to flow providing a smooth, even finish.

Fluidized bed coating makes it possible to apply films as thick as about 2.5 mm. In this method, the powder coating composition is fluidized in a fluidized bed by passing a fluidizing gas stream into a vessel containing the powder coating. A substrate is heated in an oven to a temperature above the melting point of the powder coating and is then dipped into the fluidized bed. The powder coating particles contact the hot surface, then melt and flow on the substrate surface. See generally, Kirk-Othmer, *Concise Encyclopedia of Chemical Technology*, pp. 944–945 (1985).

One attempt to achieve a chrome-like finish has been through the incorporation of aluminum particles or aluminum flake into powder coating compositions. However, mere incorporation of aluminum flake into powder coating compositions has not produced a highly shiny, reflective chrome-like appearance as measured by the high reflectance of conventional chrome electroplating without special and additional processing techniques and additives.

Powder coating composition and processes for the production of such powder compositions are needed which can form a glossy, highly reflective metallic finish that appears to be as shiny as chrome plate.

U.S. Pat. No. 5,045,114 describes a powder product that results from a process of preparing a powder coating material which can be applied to a substrate to form a coated article having a glossy, high reflective, metallic finish. The process comprises milling a resinous binder and about 1 to 12 parts of aluminum particles per 100 parts of binder, whereby the resinous binder and aluminum particles are milled and then separated from both milling media and oversized particle to produce a powder coating composition having a particle size between about 5 to 250 microns. Such powder coating materials, when applied and melt formed on a substrate surface, can exhibit high gloss, high reflectance and a metallic finish. The powder coating compositions can comprise (a) a resinous binder, (b) about 1 to about 12 parts of leafing aluminum particles per 100 parts of binder, and (c) an effective amount of a fluidizing agent per 100 parts of binder which are modified in accordance with the invention. The resinous binder and the aluminum particles are milled and then separated from the milling media and oversized particles to produce a powder coating material having a particle size between about 5.0 and about 250 microns. The aluminum flakes in all examples are provided as a paste of aluminum flakes in mineral spirits.

U. K. Patent No. 1,404,556 titled Particulate Coating Compositions and Coated Articles Prepared Therefrom describes a dry particulate composition comprising a fusible epoxy or acrylic resin and flake particles (selected from titanium nitride flake, nickel sulfide flake, cobalt sulfide flake and manganese sulfide flake, with the flakes embedded in the resin particles or affixed to their surface. Combination with aluminum flake, copper, bronze, brass, chromium and nickel flakes are also shown. The flakes and resin powder are mixed under shear conditions to reduce the size of the flake and to affix the flake to the resin. Pebble mills and any other type of high shear mixer is suggested. Examples show ball milling of the flake and resin particles (Example 1) and melting of the resin and particles in a roll mill (Example 2). A gloss over ninety is asserted to be the result of the process, with Example 2 showing a 20° gloss of 100.

U.S. Pat. No. 5,187,220 describes a thermosetting resin based coating powder containing metal flakes. The powder and flake are mixed at a temperature in the range above the softening temperature of the thermosetting resin, but below the melting temperature of the thermosetting resin, while the powder and flake composition is subjected to mechanical shear forces sufficient to prevent agglomeration of the coating powder particulates.

SUMMARY OF THE INVENTION

A method of manufacturing powder coating compositions, the powder coating compositions, and cured coatings made from the coating compositions are described. The method of preparing the coating compositions comprises combining a preformulated thermally softenable resin powder (having a defined $T_g$) and highly reflective particles, such as a non-leafing or leafing metallic flake, mica, optically variable pigments and the like (and mixtures of these pigments, particles and flakes), and then mixing the powder and flake under high shear conditions and assuring that the average temperature of the mixture remains below the $T_g$ of the resin during the high speed mixing process. The temperature may be maintained below the $T_g$ of the resin by repeatedly stopping (or slowing) the mixing (which would have low production efficiency, but would still produce an improved product) or by cooling the mixing equipment where the mixture is present. The process produces compositions which are more stable than compositions previously made by ball milling using aluminum flakes 'pasted' in solvent or plasticizer, e.g., mineral spirit, and provides coatings with a high degree of reflectivity. The process of the present invention can be used with pasted or non-pasted flakes and may display an improved performance, at least over some ball milled non-pasted powder coating systems. The process may be summarized as a process for the manufacture of a powder coating material comprising the steps of:

provide as a mixing mass of both particulate resin binder having a $T_g$ and reflective particles within a container, mixing the mixing mass under high speed mixing conditions which are capable of elevating the temperature of the mixing mass above the $T_g$ of the resin, and controlling heat in the mixing mass during mixing to keep the temperature of the mixing mass below the $T_g$ of the resin during mixing (at least to a degree so that agglomeration of the resin particles is prevented).

The process of the present invention deagglomerates the reflective particles from each other and associates the reflective particles with the resin particles, yet allows the process to be performed for extended periods of time to increase the gloss (reflectivity) of the coated product. The flakes or particles do not necessarily fuse (e.g., by melt-stick adhesion) to the resin particles, but may only distribute themselves over the surface of the particles with surface tension, electrostatic or other physical attachment means. Fusion of the reflective particles to the polymer or resin particles (as with bonded powder coatings) may be subsequently effected or may occur to some degree with impact bonding, but is not essential to the practice of the present invention. The term association includes both this superficial physical attraction and attachment or contact and also includes actual melt stick adherence or impact fusion of the reflective particles to the resin particles. There is an eventual point of diminishing return in the blending process. Additional reflectivity can not be achieved or reflectivity begins to decrease because of excessive breakdown of the reflective pigments. However, this point is only gradually reached and can be readily determined by routine experimentation.

A powder coating composition made by this process may comprise, for example, thermally softenable resin particles having a number average diameter of between about 5 to 500 or 5 to 250 microns, preferably between about 15 to 60 microns, reflective particles, pigments and/or flakes (preferably leafing metallic flakes) having a number average maximum diameter of between about 4 and 45 microns, and preferably having less than 2% or less than 1% by weight of resin of any liquid petroleum products. There is an expectation that the powder can be prepared having less than 5% by number of its reflective pigments, particles and/or flakes (e.g., leafing metallic flakes) agglomerated with other flakes which agglomeration would reduce gloss. The composition may be alternatively described as a powder coating composition comprising thermally softenable resin particles having a number average diameter of between about 15 and 60 microns, reflective pigments, particles and/or flakes (e.g., non-leafing or leafing metallic flakes) having a number average maximum diameter of between about 4 and 45 microns, and having less than about 1% or less than 2% by weight of resin of any liquid petroleum products, the powder when coated onto a surface in a continuous manner (e.g., at a thickness of at least about 5 microns or at least about 10 microns) and melted and cured, providing a reflectivity of at least 400 at 20 degrees viewing angle.

The powder coating composition may be used in a process for providing a reflective surface on a substrate comprising applying the powder coating composition onto the surface, melting the resin in the powder coating composition, and hardening said resin to form a coating having a reflectivity at 20 degrees viewing angle of greater than about 400.

DETAILED DESCRIPTION OF THE INVENTION

The invention concerns a powder coating composition which comprises (a) a resinous binder, (b) about 0.5 to 12 parts of reflective particles (for example reflective metal, preferably shiny metal, and most preferably shiny aluminum particles, mica, optically variable pigments, and the like) per 100 parts of binder, and (c) optionally an effective amount of a fluidizing agent per 100 parts of binder, whereby the resinous binder and reflective particles are blended at high shear mixing rates to produce a powder coating composition having a particle size between about 5 to about 60 microns (numerical average particle diameter for all particles).

The terminology referred to herein as "high shear" or "high speed" mixing can be related to many different factors within the process, and is not merely a function of tip speed and/or revolutions per minute, even though it is convenient and accurate to refer to those values in describing the high speed shearing and speed of the blades within the blender/mixer. The high speed procedure actually can be further described with respect to the energy/time (work) which is being put into the mixture by blending and shearing forces (as opposed to, for example, direct heat energy). In selecting a blender and conditions of operation, there are at least three issues which should be considered in the manufacture of product. The blades (usually measured by tip speed) should achieve a sufficient speed to deagglomerate the flakes (e.g., the aluminum flakes). This value appears to be at least about 2,500–3,000 feet per minute, preferably at least above 3,000 feet per minute at the tip. Two other considerations in the process are related to the energy input from the blender. These two other considerations are the rate of energy applied to the blender (which can be expressed as horsepower per pound of product). As this value is increased, the time in the blender needed to achieve the higher gloss values of the present invention decreases. Additionally, a minimum amount of work must be applied to the product to achieve the high gloss levels. As the total amount of energy applied to the material over a fixed rate of time is increased (without raising the materials temperature over the glass transition temperature or melt temperature of the polymer), the amount of agglomeration is reduced and the gloss increases.

With three separate blenders, the Welex™ (model no. TGAHK8), Mixaco™ (Model no. CM 3-12), and Bepex™ (Turbulizer TC-8), mentioned above, the rate of energy applied to the powder blend was calculated based upon the amount of material in the blender and the power draw of the motor. The power was adjusted, based on the no load power required for the blenders. The power value used in the calculation is the approximate actual amount of energy applied to the powder.

The batch blenders (Welex and Mixaco blenders) operate on substantially the same principles. Each blender has two blades. The bottom or pumping blade creates a vortex of powder. The powder flows up the walls of the container. The top of the mixing vessel has a deflector or is cone shaped. This feature forces the powder that has traveled up the wall of the vessel to fall back to the center of the vortex. The overall mixing pattern is a recirculation of powder in the container. The second blade or dispersion blade is mounted above the pumping blade and is close to the diameter of the mixing vessel (e.g., within 0.6 to 2 cm). This is where the dispersion of the reflective particles occurs. There tend to be three benefits to this flow pattern. The powder is continually recirculated to create a well-mixed powder. The pumping blade forces the powder through the high shear zone. The vortex flow of powder on the wall of the mixing vessel maximizes the heat transfer to the jacket.

The Bepex blender uses some of the same principles, but operates in a continuous manner. The blades in the blender are within 0.6 to 2 cm of the vessel walls. The rotation of the blades or paddles in the container creates a layer of powder on the wall of the container. This maximizes the heat transfer from the powder to the jacket. The paddles can be adjusted to retain or forwardly direct the powder through the blender. By setting the paddles in a configuration which will retain the powder, the residence time for the mixture can be increased and more work performed on the powder. Paddles prior to the retaining blades create the high shear forces in a shear zone for dispersion of the flakes in the resin. All of the systems used required a minimum tip speed for the dispersion blade of at least about 3000 feet per minute. This speed creates the necessary shear stress in the mixing zone required to disperse the reflective particles.

| BLENDER TYPE | RANGE, Horsepower/pound |
|---|---|
| WELEX ™ | 0.05–0.12 |
| MIXACO ™ | 0.25–0.50 |
| BEPEX ™ | 0.15–1.0 |

The energy rate per pound of product was calculated based upon the power required for the blender, the blend time, and the amount of material in the batch (or through put) in the blender. As this number is increased under controlled temperature conditions, the gloss of the product increases (asymptotically to a finite limit, of course).

The resinous binder may be either a thermoplastic resin or a thermosetting resin. Generally, the binder is a material which will flow smoothly at elevated temperatures and which will then cure (thermoset) or solidify (thermoplastic) to a final, smooth, even, solid form. Cure may be initiated by the heating or by irradiation applied after or during coating of the powder.

The terms $T_g$, softening point and melting point are often used within the field of polymer chemistry and should be understood in considering the practice of the present invention. The term $T_g$ represents the glass transition temperature for the polymer. Usually when the term $T_g$ is used without any further description, it refers to the first order glass transition temperature. As polymers may comprise units of different properties (either randomly or precisely positioned within the polymer chain, as in graft or block copolymers), different segments may exhibit different glass transition temperatures. There might be a second order glass transition temperature or a third order glass transition temperature. At each order of the glass transition temperature, there is a relaxation of internal constraints on the polymer and it becomes more plastic (e.g., flowable by shear forces), softer or more pliable. The polymer has not reached a truly fluid state upon attaining $T_g$, and so it is not considered to have melted. The term softening point (especially where differentiated from melting point) is usually a temperature significantly different from to the first order $T_g$. Although not all manufacturers make separate references to the softening temperature and the $T_g$, where references are made, the softening point tend to be significantly higher than the $T_g$. For example, in the materials catalogue and product data sheets of EMS (e.g., for Grilesta V 76-14 Powder Coating Resin), the softening point of the resin is more than 20° C. higher than the $T_g$ of the resin. Other resins display such differences with at least 10 or more 0° C. difference between the softening point and the $T_g$. This difference is readily understood as the $T_g$ is determined by attainment of a specific viscosity which is not particularly flowable or soft, while the softening point measures an actually observed softening of the resin, thereby requiring a higher temperature.

Representative, non-exclusive, thermoplastic resins include vinyl homo- and copolymers, such as polyethylene, polypropylene, ethylene copolymers, e.g., polyethylene-$C_{3-8}$ olefin copolymers, polyvinyl chloride, metallocene based copolymers, polyvinylidene fluoride, ethylene-vinyl acetate, aromatic vinyls, e.g., polystyrene and styreneacrylonitrile resins; polyacrylics, such as polyacrylates and polymethacrylates, e.g., polymethylmethacrylate and polyethylmethacrylate; cellulosics, such as cellulose ethers and cellulose esters; polyesters, such as polynaphthalene terephthalate, poly(alkylene terephthalate), e.g., polyethylene terephthalate; polysiloxanes, polyurethane resins, and polyamides, such as nylon.

The thermosetting resins used in the present invention may be either addition reaction cure or condensation reaction cure thermosetting resins. Representative, non-exclusive, thermosetting resins include epoxies such as diglycidyl ethers of bisphenol A and epoxy cresol/novalacs; phenolic resins, such as novolacs and resols; polyurethanes, such as polyester resins with blocked isocyanate groups; saturated polyesters such as saturated terephthalic acid based polyesters and carboxylated polyesters; and acrylics based on crosslinkable acrylate resins such as carboxyl terminated resins, polysiloxanes and other silicon resins, selfcrosslinking etherified methoxylated resins based on acrylamides and/or methacrylamides. Polyester resins, such as those derived from isophthalic anhydride/glycol and trimellitic anhydride/glycol are also examples of useful materials. Some of these thermosetting resins may not display a traditional $T_g$ because they are crosslinked and are more crystalline in nature, showing a sharp melting or softening point. In the practice of the invention with such sharp melting point materials (e.g., where the $T_g$ or softening point of the polymer approaches or equals the melting point), the temperature must be maintained below the softening or melting temperature, preferably at least 5 or at least 10° C. below the softening or melting temperature. Most of these thermosetting resins require the use of a curative to achieve a final crosslinked structure, but some of these, e.g., self-crosslinking etherified methoxylated resins based on acrylamides and/or methacrylamides, will selfcrosslink when subjected to elevated temperatures. Photoinitiation salts and compositions may also be provided to enable cure only upon irradiation. Such photoinitiators, for example, may include free radical initiators and the like. Examples of chemical classes of these photoinitiators include, but are not limited to arylonium salts (e.g., diaryl iodonium, triaryl sulfonium, phosphonium, diazonium), triazine, biimidazoles, benzophenones, benzoin ethers, and the like. The coupling of thermosetting resins and curative agents is well known to those skilled in the coatings art, and any such coupling can be used in the present invention which does not detrimentally affect the metallic finish of the present coating. For purposes of calculating proportions of components in thermosetting systems, curatives are included in the term "binder". Diluents and inert fillers such as coating aids, flow control agents, other binders (e.g., thermoplastic binder mixed with the thermoset resins), dyes, pigments, antistatic agents,, UV absorbers, UV stabilizers, antioxidants, catalysts, anionic or cationic initiators, acid releasing compounds, base releasing compounds, and the like may be present within the resin composition or the powder composition.

In the final, solid form, the resinous binder has a uniform content of reflective particles, such as metallic, e.g., bronze, gold, copper, brass, titanium, silver, or aluminum or metal-coated particles/metal coated films which are preferably introduced as leafing or non-leafing aluminum flakes. Leafing flakes such as leafing aluminum particles or flakes are coated with a material, e.g., stearic acid, and when applied to a surface, the particles can orient in an interleaved structure parallel to the surface of the finished coating. This can result in a highly lustrous and reflective coating. Aluminum flakes are preferably introduced at less than about 50 microns in diameter. The diameter, or more properly the maximum diameter of the metallic particles may have to be determined statistically as they tend to be high aspect ratio particles or flakes, with two major dimensions (width and length) and one minor dimension (thickness) which may be multiples or orders of magnitude smaller than the two major dimensions. When the dimension or diameter of the aluminum flakes are discussed, the maximum average diameter (e.g., either the maximum of width and length or the average of width and length, are referred to. The average width and length may be determined by statistical measurement of the surface area of the flakes, assuming the surface area to be provided by a circle, and "averaging" the width and length by determining what diameter would have provided that area to the flake.) More preferably, the aluminum flakes have a number average particle size of about 1 to about 45 microns, more preferably between 4 and 45 microns, and still more preferably between 5 and 40 microns. Most preferably, the aluminum flakes are sized such that 99.9% pass through 325 mesh screen, i.e., a diameter of less than about 45 microns, most preferably between 8 and 20 or between 10 and 17 microns.

Preferably, the leafing aluminum flakes are introduced as a dry flake rather than the paste of aluminum and solvents having at least about 40 wt-% aluminum flake and more preferably about 60 to 70 wt-% aluminum flake described in U.S. Pat. No. 5,045,114. Preferably, the metal such as the aluminum is introduced in a quantity to provide about 1 to 15 parts of aluminum particles per 100 parts of polymer, binder or resin. This percentage may be considered with or without consideration of the leafing agent (e.g., the stearic acid) used on the flakes.

The use of solvents or viscous liquid carrying agents solvent should be avoided for a number of reasons. These types of agents promote agglomeration and instability in the powder compositions, and may detrimentally affect the other components of the powder coating composition. These undesirable solvents include petroleum-based solvents such as mineral spirits, petroleum spirits, petroleum benzin, petroleum ether, ligroin, refined solvent naptha or mixtures thereof.

In addition to the above, other constituents may be incorporated into the coating composition. Such constituents include flow control agents, scavengers, fluidizers, UV stabilizers, anti-oxidants and fillers. Flow control agents are known in the polymer art and are generally incorporated into the powdered coating composition to improve the flow of the resin as it is melted to provide a smoother finish of the final solid coating. The fluidizer generally comprises inert particulates including inorganic oxide particles such as silica, alumina, zirconia or titania spheres. Fluidizer, if used, would be present as less than 5% by weight of the polymer, preferably less than 2% by weight of the polymer (binder), and more preferably less than 1% by weight of the polymer.

The process of the present invention may be described as follows. Mix a powder resin having a $T_g$, e.g., with particle sizes less than about 500 microns, preferably less than about 250 microns, more preferably less than about 100 microns and most preferably less than about 60 (e.g., 10 to 60 microns) or less than 50 microns, such as between about 10 and 50 microns, between about 20 and 50 microns or between about 30 and 50 microns) with leafing metallic flakes, then blending the resin and flakes as a mixing mass at high shearing, without allowing the average temperature of the mixing mass to rise above the $T_g$ of the resin. The prevention of the temperature of the mixing mass from rising above the $T_g$ of the resin has been found to provide beneficial effects and avoid harmful effects during the mixing operation. Such beneficial effects include dispersion of the reflective particles and increased reflectivity (gloss) in the cured film. Harmful effects would include melting of the resin, sticking of the resin and agglomeration of the reflective particles and resin. One commercial process blends the resin powder and leafing aluminum flake at high shear speeds, allowing the mixing mass temperature to exceed the $T_g$ of the resin. The high speed blending is terminated when significant agglomeration of the resin and flakes has begun. This cessation is to be differentiated from other processes called bonded powder where, after the coating powder has been formed (by the conventional process with some agglomeration), the powder composition is heated briefly (as by additional blending) or allowed to remain at the elevated temperature within the blending process to bond resin to the aluminum flakes to assertedly reduce separation of the flake and binder and avoid disuniformity within the composition. It has been found in the practice of the present invention that sustaining high shear mixing above the $T_g$ will cause significant agglomeration and (where thermal curative are present) could even cause some premature cure of the resin, while initially reached fails to deagglomerate all of the metal flakes. The failure to deagglomerate the flakes causes loss of reflective power and the possibility of irregularities in the coating because of the clumped particles.

In the present invention, by maintaining an average temperature for the mixing mass which is below the $T_g$ of the resin, the high speed shearing may be continued longer, there is less agglomeration, and the powder produces higher gloss as compared to compositions which use the same flakes and resins, and allow the mixing mass temperature to exceed the $T_g$ of the resin. The temperature of the mixing mass may be maintained below the $T_g$ of the resin by stopping the high speed shear mixing intermittently to allow the temperature to decrease (or even removing the mixing mass entirely from the mixing bowl to a cooling environment), reducing the speed of mixing intermittently to moderate the temperature, or most preferably to provide cooling mechanisms to the mixing mass container or environment so that the temperature of the mixing mass during high speed shear blending is maintained at a low temperature, that is a temperature below the $T_g$ of the resin. There are a number of physical effects and phenomena which exist in the resin and the mixing procedure which lead to preferences during this temperature control. Local heating may occur during the high speed shear mixing, especially around the shaft or fins, so local temperatures may exceed the $T_g$ of the resin even though the average mixing mass temperature may be at or below the $T_g$ of the resin. For this reason, it is desirable to maintain the average mixing mass temperature at a temperature significantly below the $T_g$ of the resin. For example, it is preferred that the average temperature of the mixing mass be maintained at a temperature at least about 1° C. below the $T_g$ of the resin, more preferably that the average temperature of the mixing mass be maintained at a temperature at least about 2° C. or at least about 3° C. below the $T_g$ of the resin, and most preferably that the average temperature of the mixing mass be maintained at a temperature at least about 5° C. or at least about 6–10° C. below the $T_g$ of the resin. The effects of potential localized heating around the shaft may be minimized by providing a cooling mechanism to the shaft. With localized temperature control such as this, the average mixing mass temperature may be allowed to approach the $T_g$ of the resin more closely.

The cooling can be done by air cooling, liquid cooling, electrical or electronic cooling (e.g., Peltier devices), or any other mechanism which can remove heat from the mixing mass during the high speed shear mixing procedure. Even chemical coolant reactions could be theoretically used, although it would be desirable to have as few extraneous materials present in the resulting composition. As noted above, the use of petroleum products such as the mineral spirits adversely affects properties of the powder composition. Thus, powder compositions with less than about 5% by weight of liquid, distillate or viscous petroleum products are preferred, preferably less than about 2% or less than about 1% or less than about 0.5% by weight of the resin, more preferably less than about 0.1% or less than about 0.01% of the resin, and most preferably the powder compositions have no liquid or viscous petroleum products present.

A general preferred range for such ingredients would include 50–90% by weight polymer (preferably 70–86% by weight), 5–50% by weight crosslinking agent (preferably 14–30% by weight), 0 to 3% flow agent, preferably 0.3 to 3% by weight flow agent (more preferably ) 0.5 to 1.5% by weight flow agent), 0.2 to 4% degassing agent, preferably 0.2 to 2.0% degassing agent (more preferably 0.3 to 1.5% by weight), and 0.8 to 8% by weight leafing aluminum flake (preferably 0.8 to 6%, or 0.8 to 3% by weight).

The cured coatings of the present invention have been found to provide coatings with high gloss. As noted in U.S. Pat. No. 5,045,114, the gloss provided in that system was about 357 at 20 degrees and 469 at 60 degrees (e.g., Table IV, Example IV). The commercial product using that process technique (milling with mineral spirits present) provides a gloss of about 550 at 20 degrees. In the practice of the present invention, dry powder coating compositions having gloss levels over 400, over 450, over 500, over 550 and over 600, up to levels exceeding 900 have been obtained. The powder coating compositions also exhibit reduced agglomeration as compared to compositions made by some other methods without using paste aluminum. For example, fewer than 8%, and preferably fewer than about 5% of the flakes are agglomerated with other flakes in the practice of the present invention. By non-agglomerated with the leafing flakes of the present invention it is meant that less than 15% of the surface area of a flake is adhered (not merely overlying the other flake, but actually bound thereto) to another flake, thereby masking its surface. An agglomerated flake therefore has at least 15% of its surface covered by another flake in an adhered manner, rather than merely lying on top of the flake. Gloss may be measured, and has been measured in data presented herein, on a BYK-Gardner gloss meter, which had been calibrated for white and black on calibration tiles specific for the gloss meter. Multiple readings were taken (and unless otherwise indicated, averages reported) with 3 readings for 3×5 panels, 5 for 4×6 panels, 7 for 4×9 panels and 8 readings for 6×12 inch panels. The procedure used was that indicated by the manufacturer in which the desired incident angle was selected by the appropriate button on the gloss meter, a statistic mode was selected, the sample platform was lowered, the statistic function was cleared, the sample was placed on the sample platform under a spotlight, the sample platform was raised, and the results were read.

As noted, the suppression of the temperature in the process may be effected by any convenient means. The most convenient means is the provision of cooling apparatus which surrounds the mixing area. The high speeds of the mixing apparatus, and the high shearing forces of the fins, blades or propellers, creates a large amount of heat within the system. It is primarily this heat which causes the temperature to tend to rise above the $T_g$ of the resin. In some processing equipment for the high speed mixing of powder coating compositions, heating systems are actually provided to increase the temperature or increase the rate at which the higher temperatures are achieved, or to bond the powdered resins and flakes. This heating above the $T_g$ of the resin is actually contrary to the benefit of the mixing procedure as found in the practice of the present invention. Any conventional cooling system which is capable of controlling the temperature of the mixing mass during the high speed mixing is useful. The heat may be withdrawn from the container holding the mixing mass, the mixing mass directly, or by cooling the air or environment around the mixing mass. The process of the present invention, by selection of available commercial equipment, can be performed in either a batch or continuous process manner.

EXAMPLES

Background Study Examples 1–4

The effects of varying shear rates, tip speeds (which have a relationship to work performed on the system), duration of the blending process, and the number of repetitions of the blending process were examined. A standard mixture of organics (the thermally curable resin) and leafing aluminum pigments were used in all of the evaluative examples. The resin selected and the leafing aluminum flake used were provided as a resin premix in all examples, unless otherwise indicated as:

78.9% by weight Polyester resin (isophthalic anhydride (IPA)/glycol; e.g., as manufactured by DSM, UCB, EMS or Ruco, Inc.) having a $T_g$ of about 55–63° C., 17.3% by weight E-caprolactam blocked isophorone diisocyanate, 1.2% by weight Acrylic flow agent, 0.8% by weight benzoin degassing agent, and 1.8% by weight leafing aluminum flake.

Volumes of the resin premix were placed into a laboratory Welex Blender (model no. TGAHK8), a specific blending speed selected (1,500; 2,000; 2,500; and 3,000 revolutions per minute [r.p.m.]), the resin premix was heated up by the energy of the blending action on the resin mass. Blending was stopped and the aluminum oxide fluidizer was added to the heated resin mass before the $T_g$ of the resin was reached (a targeted temperature of about 48° C. was chosen), and the mixture was blended for an additional fifteen seconds to assure that the fluidizer was evenly distributed. The process is usually performed with the flakes and the resin already in the blender prior to initiation of the high shear mixing, at least for the purpose of convenience. The materials may be added to the blender as alternative layers in the blender prior to initiation of the blending. The powder mass was then dumped from the blender and subsequently used in a standard powder coating procedure at various coating thickness values, and data (including gloss at 20 and 60 degrees) taken. The results are shown in TABLE 1 below.

Sample 1, 2,500 grams resin premix, 0.2% by weight aluminum oxide fluidizer, 1500 r.p.m., resin temperature of 48.2° C. upon addition of aluminum oxide fluidizer, and end temperature of 46.7° C.

Sample 2, 2,500 grams resin premix, 0.2% by weight aluminum oxide fluidizer, 2000 r.p.m., resin temperature of 48.2° C. upon addition of aluminum oxide fluidizer.

Sample 3, 2,500 grams resin premix, 0.2% by weight aluminum oxide fluidizer, 2500 r.p.m., resin temperature of 50.0° C. upon addition of aluminum oxide fluidizer.

Sample 4, 2,500 grams resin premix, 0.2% by weight aluminum oxide fluidizer, 3000 r.p.m., resin temperature of 49.3° C. upon addition of aluminum oxide fluidizer.

TABLE 1

| SAMPLE | THICKNESS | ATI DOI | 20° GLOSS | 60° GLOSS |
| --- | --- | --- | --- | --- |
| #1 | 2.5–3.2 mil | 41 | 191 | 247 |
| #2 | 2.6–2.8 mil | 36 | 189 | 243 |
| #3 | 2.8–3.3 mil | 42 | 206 | 260 |
| #4 | 2.8–3.6 mil | 37 | 195 | 248 |

Sample 1 was blended for 21.5 minutes, sample 2 for 8 minutes, sample 3 for 5 minutes, and sample 4 for 2.75 minutes.

The shear forces provided by the blending at 2,500 r.p.m. appeared to provide the best reflectance results on this composition in a single pass through the blender with the Temperature of the mixing mass maintained below the $T_g$ of the resin.

Examples 5–10

The effects of repeated blending of the resin/flake mixture at 2,500 r.p.m. while maintaining the temperature of the mixing mass below the $T_g$ of the resin was then examined. All of the samples were performed without the addition of fluidizing agent. Sample 5 comprised the mixture with a single pass through the blender for 4.5 minutes at 2,500 r.p.m. with an endpoint temperature of 48.2° C.

Sample 6 took the end product of Sample 5 and performed a second blending operation for 5 minutes at 2,500 r.p.m. with an endpoint temperature of 48.0° C.

Sample 7 took the end product of Sample 6 and performed an additional blending operation for 4.5 minutes at 2,500 r.p.m. with an endpoint temperature of 48.0° C.

Sample 8 took the end product of Sample 7 and performed an additional blending operation for 4.5 minutes at 2,500 r.p.m. with an endpoint temperature of 48.2° C.

Sample 9 took the end product of Sample 8 and performed an additional blending operation for 4.5 minutes at 2,500 r.p.m. with an endpoint temperature of 49.2° C.

Sample 10 took the end product of Sample 9 and performed an additional blending operation for 4.0 minutes at 2,500 r.p.m. with an endpoint temperature of 48.1° C.

TABLE 2

| SAMPLE | THICKNESS | 20° GLOSS | 60° GLOSS |
| --- | --- | --- | --- |
| #5 | 4.0–4.8 mil | 228 | 332 |
| #6 | 4.3–4.9 mil | 280 | 376 |
| #7 | 3.0–3.3 mil | 321 | 400 |
| #8 | 2.2 mil | 378 | 431 |

TABLE 2-continued

| SAMPLE | THICKNESS | 20° GLOSS | 60° GLOSS |
| --- | --- | --- | --- |
| #9 | 4.2–4.6 mil | 422 | 444 |
| #10 | 4.6–4.9 mil | 483 | 475 |

Although there were some variations of gloss values within each sample dependent upon the thickness of the coatings (e.g., in Sample #3, a coating thickness of 2.8–3.3 mil provided 200 gloss of 206 and 600 gloss of 260), the clear trend of the data shows that increasing the amount of high shear blending (here by repetition of the blending operations) while maintaining the temperature of the mixing mass below the $T_g$ of the resin improved the gloss.

A commercially available product produced by ball milling of wet (mineral spirits) aluminum flake in resin produced 3.0–3.4 mil coatings having 20° gloss of 555 and 60° gloss of 379. The coating, however, had a fairly grainy appearance.

Examples 11–28

The effects of cooling the blending equipment to moderate the temperature of the mixing mass so that the $T_g$ of the resin was never exceeded, and the blending could be continued indefinitely was examined. 3750 g batches of resin (the same as used in Example 1) and leafing aluminum were premixed and used in each example. A sample of the powder was removed from the Mixaco™ blender at 10 minute intervals, sieved through a 140 mesh screen, sprayed through an Anoda™ electrostatic cup gun with the setting at 2 Barr pattern air/1 Barr flow air/60 kv, the powder being sprayed to a thickness of 2.0–4.0 mil and measured for gloss at 20 and 60 degrees (as the average of three readings), with the powder cured at 400° F. for fifteen minutes. Four different blade configurations were used in the examples, 1) a single straight blade (dispersion blade), 2) two straight blades (90 degree offset), 3) a single 30° bent blade, and 4) a single straight blade (dispersion blade) and a single bent blade in a ninety degree offset.

| Single Straight Blade | | | |
| --- | --- | --- | --- |
| SAMPLE | TIME (min.) | 20° GLOSS | 60° GLOSS |
| 11 | 10 | 238 | 302 |
| 12 | 20 | 307 | 348 |
| 13 | 30 | 383 | 382 |
| 14 | 40 | 418 | 407 |
| 15 | 50 | 465 | 428 |
| 16 | 60 | 507 | 449 |

| Two Straight Blades | | | |
| --- | --- | --- | --- |
| SAMPLE | TIME (min.) | 20° GLOSS | 60° GLOSS |
| 17 | 10 | 278 | 328 |
| 18 | 20 | 365 | 381 |
| 19 | 30 | 431 | 418 |
| 20 | 40 | 495 | 449 |
| 21 | 50 | 592 | 483 |
| 22 | 60 | 630 | 495 |

Single Bent Blade

| SAMPLE | TIME (min.) | 20° GLOSS | 60° GLOSS |
| --- | --- | --- | --- |
| 23 | 10 | 482 | 436 |
| 24 | 20 | 655 | 503 |
| 25 | 30 | 742 | 528 |
| 26 | 40 | 807 | 549 |
| 27 | 50 | 827 | 553 |
| 28 | 60 | 856 | 564 |

Single Bent Blade and Single Straight Blade

| SAMPLE | TIME (min.) | 20° GLOSS | 60° GLOSS |
| --- | --- | --- | --- |
| 29 | 10 | 432 | 417 |
| 30 | 20 | 553 | 479 |
| 31 | 30 | 691 | 508 |
| 32 | 40 | 764 | 534 |
| 33 | 50 | 787 | 544 |
| 34 | 60 | 817 | 547 |

The single bent blade composition was continued for 70, 80 and 90 minute intervals, and some marginal increase in gloss was found (e.g., maximum increase of 20 in 20° gloss, and maximum increase of 12 in 60° gloss.

A Hosokawa Bepex Turbulizer™ blender was also run at 4,000 r.p.m. and cooled for various samples, with similar results (e.g., 20° gloss range of 603–628 and 60° gloss range of 490–500). A single run at 4,200 r.p.m., without any attempt at optimization, also displayed reduced gloss from the best results at 2,500 to 4,000 r.p.m. (e.g., 20° gloss range of 379–389 and 60° gloss range of 397–402). This apparatus was run in a continuous operation with mix fed into one end and blended product removed at the other end.

The efficiency of the different blenders can be seen in the difference between relative values between the hp/pound and the hp-hours/pound used by the equipment.

| BLENDER TYPE | RANGE, Horsepower-hours/pound |
| --- | --- |
| WELEX ™ | 0.02–0.06 |
| MIXACO ™ | 0.05–0.10 |
| BEPEX ™ | 0.05–0.10 |

It is believed that at least 0.01 horsepower-hours/pound, preferably at least 0.02 horsepower-hours/pound, more preferably at least 0.04 or 0.05 horsepower-hours/pound, still more preferably at least 0.07 or at least 0.08 horsepower-hours/pound, and most preferably at least 0.09 or at least 0.10 horsepower-hours/pound should be applied to the mixture of binder and flake while maintaining the temperature of the mixture mass below the $T_g$ or melt temperature of the polymer to gain the best benefits of the present invention. Of course, a limit to gloss will be attained, but values in excess of 800 and 900 have been achieved, as shown by the examples.

It is to be noted that the energy rates listed above are higher input rates than the natural heat loss rate of the blenders without modification. All blenders had to be run with external cooling means. In these experiments all blenders were run with cooling water flowing through a jacket system, with the jacket surrounding the mixing chamber. Any other means of removing heat and cooling the mixing chamber are functional, of course. The mixture mass, usually through cooling of the mixing chamber or other areas of the blender could be performed by indirect or direct cooling with a jacket system. An indirect system could be a jacket or coil (e.g., or electronic Peltier system) on the outside of the mixing chamber, or a jacket or other cooling system within the mixing chamber (but insulated so that it would not react with the materials within the chamber). The cooling fluid could be a liquid or gas. Direct cooling would encompass such actions as the addition of inert components into the mixture mass within the blender. Heat would be removed by evaporation of the inert material. The use of cooled gas flows, liquid nitrogen, dry ice, and the like would be one way of effecting that process. Chilled air (not preferred because of the oxygen content) or relatively inert gases could be directed through the blending chamber to remove the heat generated.

The following examples evaluate the effects that variations in the blades within a single mixer may have on the gloss development while maintaining the temperature of the mixing mass below the $T_g$ of the polymeric resin. A Mixaco batch blender was used in the examples. A similar resin/flake composition as used in Examples 11–28 were used here.

| Time Minutes | 30° Blade Avg. Temp. $O_C$ | 30° Blade 20 degree gloss | 45° Blade Avg. Temp. $O_C$ | 45° Blade 20 degree gloss |
| --- | --- | --- | --- | --- |
| 0 | 1 | 79 | 1 | 79 |
| 30 | 26 | 475 | 22 | 415 |
| 45 | 35 | 636 | 26 | 520 |
| 60 | 33 | 694 | 26 | 615 |
| 75 | 35 | 733 | 24 | 702 |
| 90 | 38 | 651 | 24 | 749 |

Other efforts were made to attempt to evaluate controlling conditions on the provision of high gloss compositions from these materials. The same materials which provided a high gloss composition in the practice of the present invention with high shear mixing with temperatures maintained below the Tg of the resin would not produce gloss of similar quality when materials were first extruded, then ground in a conventional grinder with temperatures maintained below the Tg of the resin. For example, 20 degree gloss less than 100 was typically obtained.

Different reflective particles, such as manufactured by US Aluminum, Obron Atlantic and Toyal leafing flakes were used in high shear mixing processes. Resin particle compositions of both blocked polyurethane compositions and polyester/triglycidylisocyanurate were used with success.

Example 29

This Example evaluates the use of a pasted aluminum reflective particle (flake) in a high shear mixing process according to the practice of the present invention. A composition comprising 98.5% by weight of the same polymer resin particles used in Example 1 and 1.5% by weight of pasted aluminum flake was used in this example. A Welex blender (fully cooled by a water flow jacket) was used with 20 minutes at 2500 rpm, 30 minutes at 3000 rpm, 10 minutes at 3500 rpm, and 15 minutes at 4000 rpm. Samples were taken at different time intervals to evaluate the reflectivity at 20 and 60 degree gloss.

| Sample No. | Time (min.) | 20° Gloss | 60° Gloss | R.P.M. |
| --- | --- | --- | --- | --- |
| 1 | 5 | 224 | 313 | 2500 |
| 2 | 10 | 257 | 360 | 2500 |
| 3 | 15 | 253 | 368 | 2500 |
| 4 | 20 | 253 | 373 | 2500 |
| 5 | 25 | 281 | 381 | 3000 |
| 6 | 30 | 284 | 390 | 3000 |

As can be seen from these data, the gloss at 20 degrees increased most significantly with the pasted flake powder composition at the higher mixing speeds under cooled conditions. These pasted flake compositions were not optimized. Using 2.6% by weight pasted aluminum flake in a different curable resin composition with 50 minutes at a lower mixing rate (2500 rpm in the fully cooled Welex mixer) produced only a gloss of 99 at 20 degrees. Higher concentrations of pasted flakes seemed to provide higher gloss under similar mixing conditions.

The powder coating compositions with liquid petroleum products (e.g., from the pasted aluminum flakes) tend to be tacky and prone to agglomeration over time as compared to the non-pasted systems.

What we claim:

1. A process for the manufacture of a powder coating material comprising the steps of: providing as a mixing mass both particulate resin binder having a $T_g$ and about 0.5 parts to about 12 parts of reflective particles per 100 parts of said binder within a container, mixing said mixing mass, and controlling temperature in said mixing mass during said mixing to keep the temperature of said mixing mass below the $T_g$ of the resin during said mixing so as to produce a powder coating material that, when coated onto a surface, provides a 20° gloss measurement of at least about 189.

2. The process of claim 1 wherein said controlling temperature is effected by removing heat from said mixing mass during the time when mixing has begun and mixing has been completed.

3. The process of claim 2 wherein sufficient heat is removed from said mixing mass during said mixing that the average temperature of the mixing mass remains more than 2 Centigrade degrees below said $T_g$ of the resin during said mixing.

4. The process of claim 2 wherein sufficient heat is removed from said mixing mass during said mixing that the average temperature of the mixing mass remains more than 5 Centigrade degrees below said $T_g$ of the resin during said mixing.

5. The process of claim 1 wherein said mixing is performed with blades in a mixer, and the speed of the blades at its tips are at least 4,500 feet/min.

6. The process of claim 2 wherein sufficient heat is removed from said mixing mass during said mixing by means comprising a step selected from the group consisting of cooling of a mixing container and stopping said mixing.

7. The process of claim 2 wherein said reflective particle have average maximum diameters of from about 5 to 40 microns.

8. The process of claim 1 wherein said reflective particles comprise pasted metallic reflective flakes.

9. The process of claim 1 wherein said reflective particles comprise metallic particles.

10. The process of claim 2 wherein said reflective particles comprise metallic particles.

11. The process of claim 3 wherein said reflective particles comprise metallic particles.

12. The process of claim 4 wherein said reflective particles comprise metallic particles.

13. The process of claim 5 wherein said reflective particles comprise metallic particles.

14. The process of claim 6 wherein said reflective particles comprise metallic particles.

15. The process of claim 1 wherein said powder coating material, when coated onto a surface, can be melted to provide a 20° gloss measurement of at least about 400.

16. A process for the manufacture of a powder coating material comprising the steps of: providing as a mixing mass both particulate resin binder having a $T_g$ and about 1 part to about 15 parts of reflective particles per 100 parts of said binder within a container, mixing said mixing mass, and controlling temperature in said mixing mass during said mixing to keep the temperature of said mixing mass below the $T_g$ of the resin during said mixing so as to produce a powder coating material that, when coated onto a surface, provides a 20° gloss measurement of at least about 189.

* * * * *